US 6,623,880 B1

(12) United States Patent
Geisbrecht et al.

(10) Patent No.: US 6,623,880 B1
(45) Date of Patent: Sep. 23, 2003

(54) FUEL CELL-FUEL CELL HYBRID SYSTEM

(75) Inventors: Rodney A. Geisbrecht, New Alexandria, PA (US); Mark C. Williams, Morgantown, WV (US)

(73) Assignee: The United States of America as represented by the Department of Energy, Washington, DC (US)

(*) Notice: Subject to any disclaimer, the term of this patent is extended or adjusted under 35 U.S.C. 154(b) by 207 days.

(21) Appl. No.: 09/865,425

(22) Filed: May 29, 2001

(51) Int. Cl.[7] .......................... H01M 8/00; H01M 8/04; H01M 8/10
(52) U.S. Cl. ............................ 429/12; 429/17; 429/30
(58) Field of Search .......................... 429/12, 13, 17, 429/29, 30, 34, 38, 39

(56) References Cited

U.S. PATENT DOCUMENTS 6,083,636 A * 7/2000 Hsu ............................. 429/13
6,294,278 B1 * 9/2001 Wohr et al. ................... 429/24
6,458,477 B1 * 10/2002 Hsu ............................. 429/17
6,492,055 B1 * 12/2002 Shimotori et al. ............. 429/34

FOREIGN PATENT DOCUMENTS

DE    196 11 591 A1  *  9/1997  ............. H01M/8/12
JP    2000-268832    *  9/2000  ............. H01M/8/00

* cited by examiner

Primary Examiner—Randy Gulakowski
Assistant Examiner—Donald V. Scaltrito
(74) Attorney, Agent, or Firm—Bradley W. Smith; Mark P. Dvorscak; Paul A. Gottlieb

(57) ABSTRACT

A device for converting chemical energy to electricity is provided, the device comprising a high temperature fuel cell with the ability for partially oxidizing and completely reforming fuel, and a low temperature fuel cell juxtaposed to said high temperature fuel cell so as to utilize remaining reformed fuel from the high temperature fuel cell. Also provided is a method for producing electricity comprising directing fuel to a first fuel cell, completely oxidizing a first portion of the fuel and partially oxidizing a second portion of the fuel, directing the second fuel portion to a second fuel cell, allowing the first fuel cell to utilize the first portion of the fuel to produce electricity; and allowing the second fuel cell to utilize the second portion of the fuel to produce electricity.

14 Claims, 5 Drawing Sheets

FIG 1. Conceptual Schematic of Dual Fuel Cell System (CH4 Case) 10

FPR - fuel prep reactors (pre-reform/sulfur sorbent)
SOFC - solid oxide fuel cell
LTS - low temperature shifter
SCO - selective catalytic oxidizer
PEFC - polymeric electrolyte fuel cell
HRSG - heat recovery steam generator

Energy Removal Duty Versus Fuel Utilization
Normalized to 40% Fuel Utilization Maximum Cell Voltage (Nernst Potential) Versus Utilization of a SynGas Fuel (1:1 H2:CO2) at 1.5 Air:Fuel Equivalence Ratio

FUEL CELL-FUEL CELL HYBRID SYSTEM

CONTRACTUAL ORIGIN OF THE INVENTION

The U.S. Government has rights in this invention pursuant to employer-employee relationship of the U.S. Government to the inventors as U.S. Department of Energy employees at the National Energy Technology Laboratory.

BACKGROUND OF THE INVENTION

1. Field of the Invention

This invention relates to the field of electrolytic fuel cells and more particularly to two fuel cell hybrid systems.

2. Background of the Invention

Having a clean reliable source of power, close at hand, is foremost on the minds of many building engineers, municipal managers, automotive designers and government energy policy makers. Indeed, the recently proposed National Energy Security Act of 2001 establishes a 10 percent investment credit for purchase of distributed power.

Fuel cells hold promise as such a source of power, particularly in light of their "six nines" reliability, wherein they are capable of delivering uninterrupted power 99.9999 percent of the time. Aside from reliability, fuel cells also offer efficiency advantages, inasmuch as fuel cells convert chemical energy directly to electricity. As such, the Carnot cycle limitations seen typical heat-to-work conversion systems do not exist in fuel cell energy production scenarios.

Another advantage of fuel cells is that the cells themselves have no moving parts. Rather, the "balance of plant" such as pumps, blowers, heat exchangers and other systems, are more likely to fail first. Current fuel cell applications suffer from unreliabilities associated with the balance of plant scenario. All fuel cells, especially high temperature fuel cells, require spent fuel/waste heat recovery subsystems. High temperature fuel cells typically are targeted for scenarios requiring more than one megawatt of power output.

Low temperature fuel cells, for example those utilizing proton exchange membranes, are typically targeted for those applications requiring less than one megawatt of power. These low temperature cells require fuel reforming subsystems to process such feed stocks as natural gas, propane or other readily stored fuels into carbon dioxide and hydrogen. Such fuel reforming subsystems (actually compact petrochemical plants), involve direct combustion of some of the fuel for making steam and to supply reforming energy. As such, fuel reforming lowers the efficiency of the entire system. By contrast, the aforementioned high temperature fuel cells such as the molten carbonate fuel cell (MCFC) and the solid oxide fuel cell (SOFC) can process natural gas or other hydrocarbon fuels into suitable fuels (carbon dioxide and hydrogen) directly, i.e., with the waste heat of the fuel cell.

Solid-state oxide fuel cells (SOFC's) are particularly durable and economic. Solid electrolyte fuel cells exhibit a much lower rate of corrosion reactions and of electrolyte loss than liquid electrolytic fuel cells. Also, fuel processing for SOFC's is less expensive than for liquid electrolytic fuel cells.

SOFC's typically operate at a temperature of approximately 900° C. This high temperature is required in order to obtain adequate electrolyte conductivity. As noted supra, operation at so high a temperature requires providing means for disposing of the heat released by the cell. Usually, the fuel cell is integrated with a heat engine, forming "fuel cell/heat engine hybrids." These hybrids use excess heat from the fuel cells to generate steam which in turn is utilized to drive small micro-turbines for additional electricity generation. U.S. Pat. No. 5,541,014 discusses how gas turbines are essential systems components of these hybrid applications. However, these hybrids detract from the advantages of fuel cells in that they are bulky and noisy, they produce vibrations, and they comprise a multitude of moving parts that require frequent maintenance. As such, the inherent advantages of fuel cells, such as modularity, scalability, quietness, and low maintenance, are replaced with rotating equipment issues.

U.S. Pat. No. 5,541,014 to Micheli et al, utilizes an SOFC/MCFC in an effort to capture CO liberated during syngas production in the SOFC phase. However, both fuel cells are high temperature fuel cells. Indeed, MCFC operates at approximately 650° C. Also, inasmuch as the electrolyte in MCFC is liquid, corrosion and electrolyte loss are possible.

A need exists in the art for a fuel cell hybrid system with a balance of plant approaching the six nines reliability of the cells themselves. The system would combine the advantages of both high temperature fuel cells and low temperature fuel cells, but without the disadvantages of each system. Also, the system would be modular and scalable so as to be attractive for use in the transportation and propulsion power sectors. And, the system should be adaptable to hydrogen co-generation in industrial settings.

SUMMARY OF THE INVENTION

It is an object of the present invention to provide a hybrid fuel cell system that overcomes many of the disadvantages of the prior art.

It is another object of the present invention to provide a fully integrated hybrid fuel cell system. A feature of the present invention is the use of two fuel cells in tandem whereby a solid oxide fuel cell is utilized to selectively introduce oxygen, electrochemically into a fuel stream to supercharge the fuel stream with oxygen for more efficient thermodynamic conversion by a low temperature fuel cell. An advantage of the present invention is full compatibility between the system's components.

It is yet another object of the present invention to provide a hybrid fuel cell that allows efficient integration of the heat released by the system. A feature of the present invention is the use of two fuel cells in an electric power device where the heat released by a high temperature cell is utilized by a low temperature cell. An advantage of the present invention is that it efficiently utilizes heat released by the high temperature fuel cell, so as to raise efficiency of the hybrid system by 15–25 percent over that typically seen by each fuel cell operating independently.

It is yet another object of the present invention to provide a hybrid fuel cell system that employs both a high temperature fuel cell and a low temperature fuel cell. A feature of the invention is that the high temperature fuel cell (having an anionic electrolyte) only partially consumes, yet completely reforms incoming feedstock so that the more-efficient low temperature fuel cell (having a cationic electrolyte) can completely oxidize the remaining, reformed feedstock. An advantage of the invention is that efficiencies of between 65 percent and 75 percent are realized.

Briefly, the invention provides for a device for converting chemical energy to electricity, the device comprising a high temperature fuel cell having a means for partially oxidizing, and completely reforming fuel, and a low temperature fuel cell juxtaposed to said high temperature fuel cell so as to utilize the remaining, reformed fuel from the high temperature fuel cell.

Also provided is a method for producing electricity comprising directing fuel to a first fuel cell, completely oxidizing a first portion of the fuel and partially oxidizing a second portion of the fuel, directing the second fuel portion to a second fuel cell, allowing the first fuel cell to utilize the first portion of the fuel to produce electricity; and allowing the second fuel cell to utilize the second portion of the fuel to produce electricity.

BRIEF DESCRIPTION OF THE DRAWING

The present invention together with the above and other objects and advantages may best be understood from the following detailed description of the embodiment of the invention detailed in the drawing, wherein.

DETAILED DESCRIPTION OF THE INVENTION

The present invention provides hybrid fuel-cell/fuel-cell devices and a method that allow optimal spent fuel utilization and waste heat recovery from a high temperature fuel cell.

The present invention utilizes the combination of a high temperature fuel cell (to provide energy for partial-oxidation-based reforming) and a low temperature fuel cell (to provide more efficient chemical to energy conversions) to arrive at a hybrid multi-fuel cell power plant. A salient feature of the invented hybrid system is that the electrolytes of the high temperature and low temperature fuel cells are complementary in that the components of hydrocarbon fuels (carbon and hydrogen) are eventually concentrated into separate product streams. By teaming the anionic electrolyte of the high temperature fuel cell with the cationic electrolyte of the low temperature fuel cell, the products of fuel usage ultimately end up in separate streams—carbon dioxide in a nitrogen-free stream and water in an admixture with combustion air-derived stack gases. The hybrid arrangement accomplishes what would otherwise require either an additional separation of carbon dioxide from stack gas or separation of oxygen from air. The permselective properties of the electrolytes are exploited in a synergistic fashion to accomplish a separation that is additional to their electrochemical functions.

The high temperature fuel cell may be any of the currently available solid-state oxide fuel cells (SOFC's) which are particularly durable and economic. This invention teams up a SOFC with a low temperature cell which may be either a polymer electrolyte fuel cell (PEFC) or a phosphorus acid fuel cell (PAFC).

High Temperature
Fuel Cell Detail

A salient feature of the invention is the combination of a high temperature fuel cell with a low temperature fuel cell so as to benefit from the residual heat of the former and the improved thermodynamics of the latter. In this patent specification, high temperatures are those operating in the range of between 500 and 1200° C. A myriad of high temperature fuel cells are available for use in this invented combination, including, but not limited to molten carbonate fuel cells and solid oxide fuel cells.

Electrolytes for use in high temperature fuel cells include the ceramic based materials zirconia, ceria, gallium oxides, and others. This is particularly true for the solid oxide fuel cells (SOFCs), discussed infra. Molten carbonate electrolytes (e.g. alkali carbonates) in a porous, dielectric matrix (e.g. $LiAlO_2$) are suitable for molten carbonate fuel cells.

Figure 1:
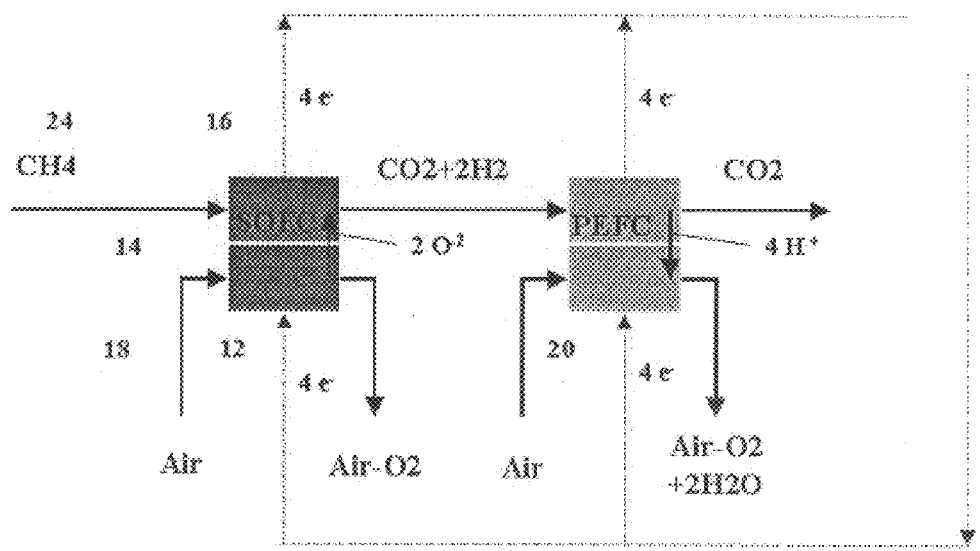
FIG. 1 is a schematic diagram of a two fuel cell device, in accordance with features of the present invention.

SOFCs are particularly attractive inasmuch as leaking and therefore corrosion of componentry is minimized. Also, SOFCs are preferred for the more complete reforming that can be achieved at SOFC temperatures for a given level of fuel utilization. In this invention, the SOFC serves as an air-fired electrochemical reformer and an electrical energy producer. SOFCs employ a doped inorganic oxide as the electrolyte. FIG. 1 is a global picture of the multi-fuel cell device 10, wherein a SOFC 12 is incorporated. The SOFC 12 uses zirconia doped with yttria as its electrolyte 14. This electrolyte has good ion conductivity at 1000° C. Other electrolytes based upon materials such as cerium and gallium oxides are candidates for the SOFC, especially for the lower temperature applications below 800 C. where non-ceramic materials may be used for components such as electrical interconnects.

Generally, hydrogen and ionized oxygen produce water and free electrons at the anode 16, while air-derived oxygen and free electrons form ionized oxygen at the cathode 18. At 1000° C., noble metal catalysts are not needed and, inasmuch as the electrolyte is immobile, its management is straightforward. The present invention contemplates the use of SOFC's that are air fired and internally reforming. Finally, and as noted supra, the waste heat being released at this high temperature fuel cell facilitates partial oxidation reformulation of fuel for use downstream by a relatively low temperature fuel cell. Suitable SOFC's that are fully sealed, internally recuperated, and operated at low air/fuel equivalence ratios are available from Siemens-Westinghouse for units in the 200 to 300 kilowatt range. Global Thermoelectric of Calgary, AB, Canada also provides SOFC units for small scale users. Additionally, several DOE-sponsored SOFC units, operating in the 5–10 kilowatt range, are suitable.

Low Temperature
Fuel Cell Detail

Low temperature fuel cells are those which operate at or below 350° C., and typically at between 80 and 200° C. For optimal functioning, the low temperature fuel cell should utilize an electrolyte that is complementary to that of the high temperature cell (anionic conducting versus cationic conducting electrolytes) so that products of fuel usage ultimately accumulate in separate streams. Preferably, carbon dioxide is isolated in a first stream, whereas water is found admixed with combustion-air-derived stack gases in a second stream.

Either a polymer electrolyte fuel cell (PEFC) or a phosphorus acid fuel cell (PAFC) can be used in conjunction with this invention. Suitable PEFC's, operational at approximately 80° C., are available from Ballard Power Systems, Vancouver, B.C., Canada and Plug Power of Latham, N.Y. Alternatively, PAFCs, operational at approximately 200° C., are available from International Fuel Cells of South Windsor, Conn. For the sake of brevity, and where appropriate, the discussion below will be limited to PEFC's.

Low temperature fuel cell membrane electrolytes include acid membrane based materials for PEFCs. Exemplary acid membrane materials are perfluorinated ion-exchange membranes such as Dupont's Nafion® and polytetrafluoroethylene-based materials such as Gortex®. For PAFCs, electrolytes comprising phosphoric acid in a porous dielectric matrix (e.g. Teflon) is suitable. PEFCs are currently preferred for its potentially lower cost and improved performance.

As with the SOFC, the PEFC, designated as numeral 20 in FIG. 1, requires hydrogen fuel. As noted supra, present state of the art is to provide the hydrogen from steam reforming. This reforming is necessary to separate the hydrogen from the original feedstock. In the present invention, the provision of this fuel reforming is accomplished by the SOFC, for instance by means of hybrid partial oxidation utilizing the SOFC for the reforming of natural gas or distillates 24. The high operating temperature of the SOFC makes it an advantageous reforming from a kinetic point of view.

Sequestering/Nonsequestering Detail

The present invention of a fuel-cell/fuel-cell hybrid system may be implemented in either a Sequestering Version or a Non-Sequestering Version.

Figure 2:
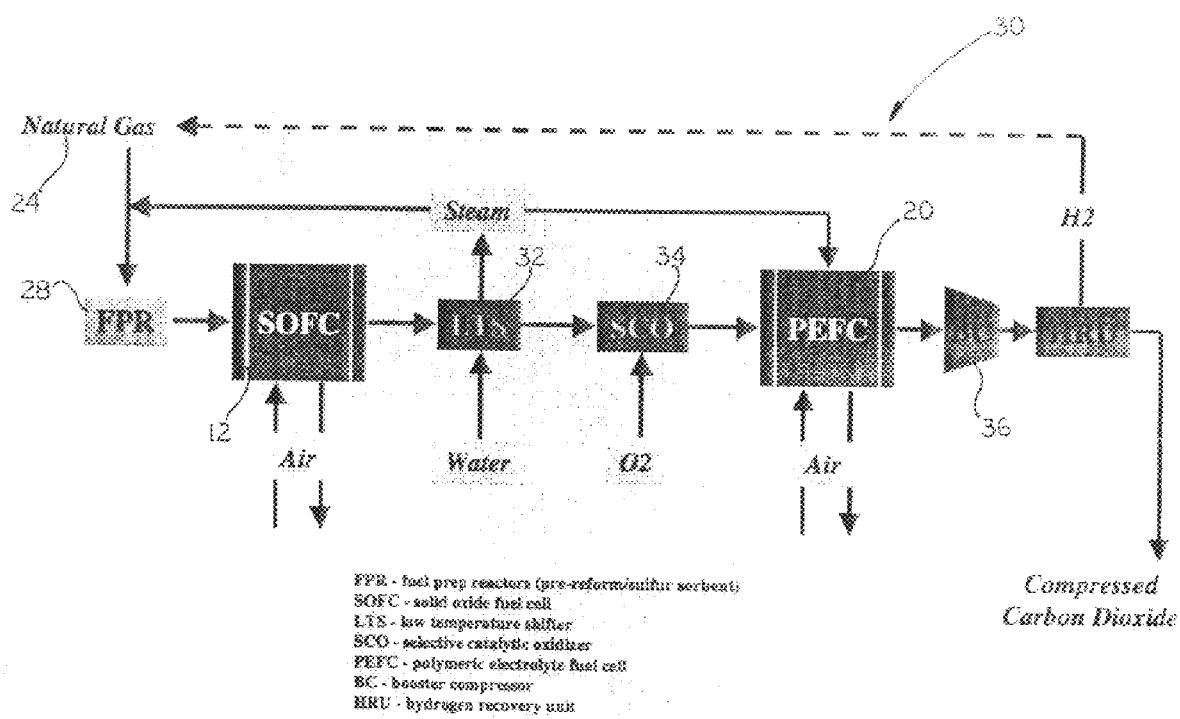
FIG. 2 is a schematic diagram of a sequestering fuel-cell/fuel-cell hybrid system, in accordance with features of the present invention.

The Sequestering Version of the system is shown in FIG. 2, generally designated as 30. The fuel is prepared from natural gas in a conventional Fuel Preparation Reactor (FPR) 28 and then injected into the SOFC 12 together with air providing the oxidant for the fuel cell. Syngas ($H_2$+CO) output from the SOFC is directed to a low temperature shifter (LTS) 32 wherein, through heat exchange, water is converted to steam. The output of the LTS 34 is combined with oxygen in a Selective Catalytic Oxidizer (SCO) 34 where CO is reduced from several hundred parts per million (ppm) to below 10 ppm. The output from the SCO is directed in turn into the PEFC 20 while air is supplied to provide the oxidant for the fuel cell. The steam from the LTS 32 is directed to the PEFC 20 and the SOFC 12. In the SOFC 12, steam is used as a reactant for the reforming and the downstream shift reactions and to control against the formation of Carbon deposits. In the PEFC 20, steam is used to humidify the fuel and air streams so as to maintain the water balance in the electrolyte and electrodes.

The output from the PEFC 20 is directed to a Booster Compressor (BC) 36 and then to a Hydrogen Recovery Unit (HRU) 38 from which hydrogen is directed back to the FPR 28. Carbon dioxide is recovered in appropriate containers. The FPR, SOFC, LTS, SCO, PEFC, BC, and HRU are all prior art devices. The Fuel Preparation Reactor (FPR) 28 is basically a guard bed for removal of sulfur and depends upon the properties of the fuel. In the event of a sulfur-free fuel, the FPR would not be needed. In the case of a natural gas containing hydrogen sulfide, the FPR would comprise an adsorption system containing any of several commercially available sulfur sorbents such as ZnO.

Since a significant amount of fuel has been oxidized in the SOFC, the spent fuel is more easily processed for usage in a PEFC than in conventional systems based entirely on steam reforming; sulfur levels in the product exiting a SOFC will be lower, and the C/H/O ratio will be enriched in oxygen, akin to a product from a partial oxidation or autothermal reformer rather than from a steam reformer.

The Low Temperature Shifter (LTS) 32 comprises a catalytic shift reactor using a commercially available low temperature catalyst such as the copper based catalysts that can be used to approach shift equilibrium below 400 F. Since the all-fuel-cell based hybrid (as opposed to the conventional fuel cell gas turbine hybrids) can be operated at ambient to low pressure levels, the operating temperature of the LTS is sufficient for generating low pressure process steam from the sensible heat and heat of reaction in the shifter. A shell and tube configuration is a design option wherein saturated process steam generation in the shell could be used to passively control the reaction temperature in the catalytic reactor tubes.

The Selective Catalytic Oxidizer (SCO) 34 comprises an adiabatic catalytic oxidation reactor using commercially available supported platinum catalyst selective for oxidizing CO relative to $H_2$ at temperature below 400 F. The performance requirements on the SCO will be simpler than in a conventional PEFC system since the CO loads will be lower as a result of the more favorable (oxygen enriched) C/H/O ratio that was established in the upstream SOFC.

The Hydrogen Recovery Unit (HRU) 38 would comprise any of several means for accomplishing separation of $H_2$ from $CO_2$ at conditions of temperature and pressure that are standard commercial practice. In one option, hollow fiber, shell and tube membrane permeation of $H_2$ is used, whereas in another, pressure swing adsorption (PSA) is used. In the preferred option for the Sequestering Version, a palladium based alloy is used as a permselective membrane layered on a porous support tube through which $H_2$ is diffused from a high pressure into a shell that is swept with incoming fuel and process steam for recycle to the FPR 28. A commercially available reciprocating compressor is used for the Booster Compressor (BC) 36 to pressurize spent fuel from the PEFC for simultaneous sequestration of $CO_2$ and recycle of $H_2$.

Figure 3:
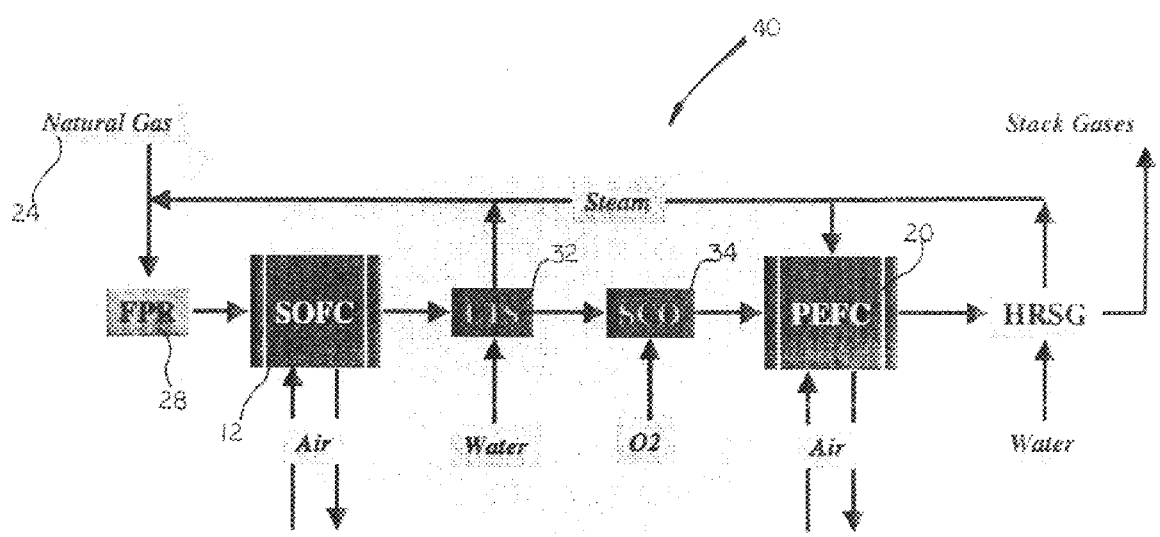
FIG. 3 is a schematic diagram of a Non-sequestering fuel-cell/fuel-cell hybrid system, in accordance with features of the present invention.

The Non-Sequestering Version of the system is shown in FIG. 3 and generally designated as 40. Just as in the Sequestering Version, the fuel is prepared from natural gas in a conventional Fuel Preparation Reactor (FPR) 28 and then injected into the SOFC 12 together with air providing the oxidant for the fuel cell. The output from the SOFC is directed to a low temperature shifter (LTS) 32 wherein water, through heat exchange, is converted to steam. The output of the LTS 32 is combined with oxygen in a Selective Catalytic Oxidizer (SCO) 34 whose output is directed in turn into the PEFC 20 with air providing the oxidant for the fuel cell. The steam from the LTS 32 is directed to the PEFC.20 and the SOFC 12. In the Non-Sequestering Version the output from the PEFC is directed to a Hydrogen Burner/Heat Recovery Steam Generator (HRSG) 42 wherein water is converted into steam which is directed to the PEFC and the SOFC. The output from the HRSG 42 is released as stack gases.

As in the Sequestering Version, the FPR, SOFC, LTS, SCO, and PEFC are all prior art devices. The $H_2$ rich PEFC tailgas is combusted (if need be in a catalytic burner) and passed through a standard low pressure steam generator that serves as the Heat Recovery Steam Generator (HRSG) 42 for generation of additional process steam to humidify the SOFC and PEFC feed streams.

In both cases the Hydrogen stream in question is the relatively small PEFC tailgas.

There is remarkable synergy in the invented SOFC/PEFC (or SOFC/PAFC) hybrid system.

Figure 4:
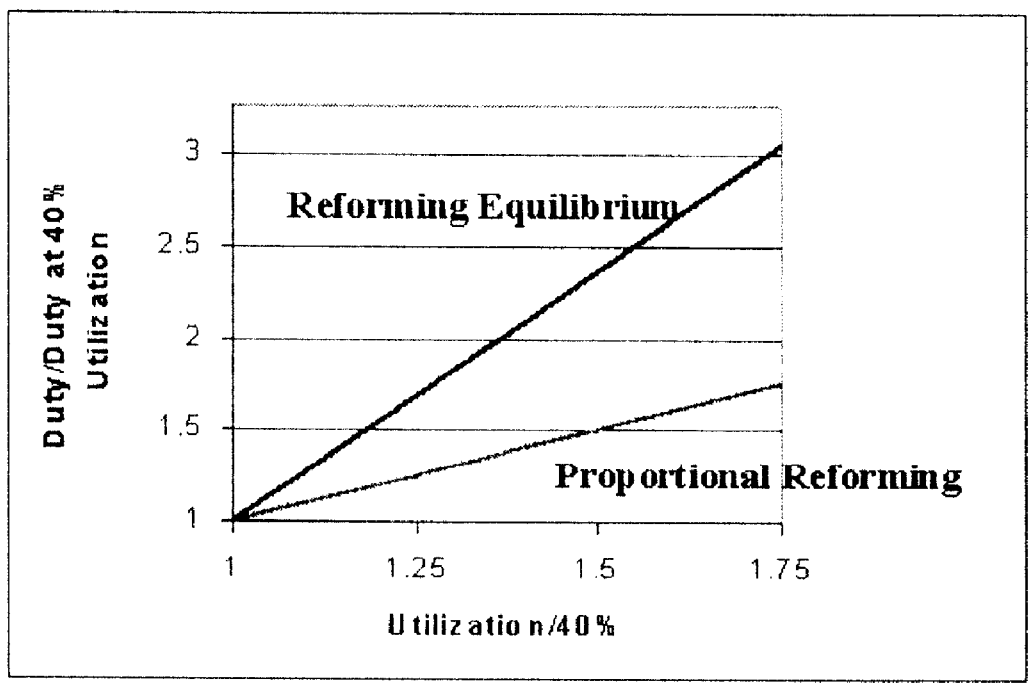
FIG. 4 is a graph depicting the fuel conversion and reforming characteristics of a device comprising a high temperature fuel cell juxtaposed to a low temperature fuel cell, in accordance with features of the present invention.

1. The SOFC as a reformer for the PEFC: fuel conversion in the SOFC is limited to a level sufficient for reforming the natural gas into syngas ($H_2$, CO, $CO_2$), but not completely oxidizing it. This lessens the requirements for waste heat management in the SOFC, as shown in FIG. 4 which plots the amount of energy that needs to be removed from the fuel cell, either as power or waste heat, in order to control the operating temperature as reforming reactions proceed to equilibrium. Note that reforming is not directly proportional to fuel conversion (lower curve). Rather, reforming is nearly completed at fuel conversion levels of 40 percent.

At fuel conversion levels in excess of 40 percent, nearly complete fuel reformation into syngas occurs at typical SOFC operating temperatures when the fuel is humidified with enough steam to avoid carbon deposition. Oxygen influx into the fuel corresponding to fuel conversions in excess of 40 percent is sufficient to achieve a net exothermicity of the reaction with a suitable C/H/O ratio for complete reformation into syngas. In as much as the oxygen influx is electrochemically fed as $O^{-2}$ through the electrolyte and effects a nearly complete reformation of the fuel, the SOFC serves as an electrochemical partial oxidation reformer and an electric energy producer. Unlike conventional partial oxidation reformers, a cryogenic system is not needed to extract oxygen from air to avoid dilution of the syngas with nitrogen. This eventually results in the generation of a neat $CO_2$ stream, thereby facilitating simplified carbon dioxide sequestration. It is this phenomenon that makes air firing of both fuel cells a salient component of the invented system.

Figure 5:
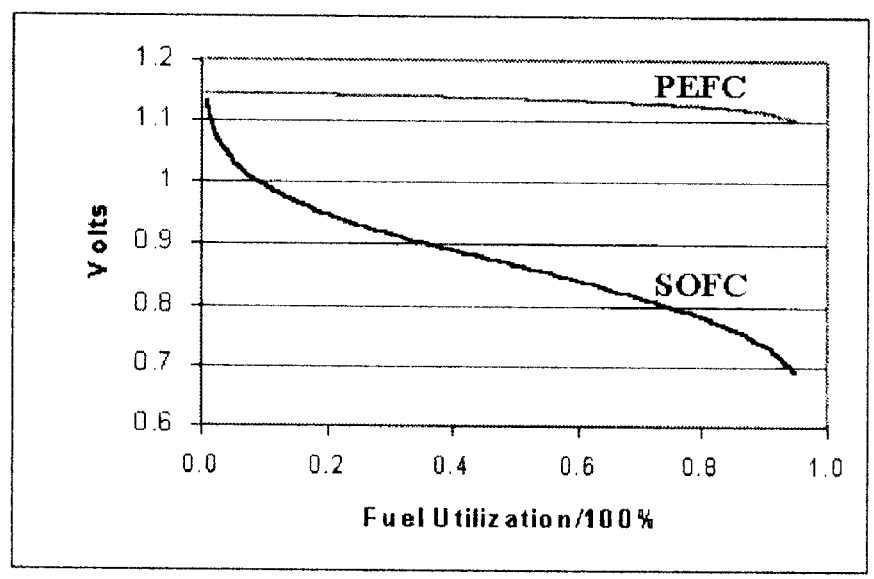
FIG. 5 is a graph depicting the thermodynamics of a device comprising a high temperature fuel cell and a low temperature fuel cell, in accordance with features of the present invention.

2. The PEFC as a Chemical Bottomer for the SOFC: the PEFC, with a cationic electrolyte, provides a stable low temperature sink that enhances the efficiency of utilizing the remaining reformed fuel produced by the SOFC. FIG. 5 illustrates the more favorable thermodynamics of using the low temperature fuel cell (e.g., PEFC) compared to the high temperature fuel cell for electrochemical conversion of the reformed fuel. The Nernst potential in FIG. 5 places an upper limit on the cell voltage, showing the advantages of using the PEFC as a chemical bottomer for the SOFC.

3. SOFC/PEFC and Carbon Dioxide Sequestration: Because of the use of complementary electrolytes, air separation units or acid gas removal units are not required to capture the carbon dioxide for sequestration. Both fuel cells are air fired, but their combination achieves complete fuel utilization without the mixing of fuel-derived carbon dioxide with air-derived stack gases.

4. PEFC Cycle-ability and SOFC Baseloading: because of their smaller heating cycles and more compliant materials, low temperature fuel cells are inherently more cyclable than high temperature fuel cells. The present invention allows the use of a SOFC as reformer for Hydrogen production and the co-production of electric power, with the PEFC being used to vary the product mix for peaking purposes. The SOFC/PEFC hybrid is particularly indicated for industrial Hydrogen production and for transportation and propulsion power systems.

Performance of The Fuel-Cell/Fuel-Cell Hybrid System.

The hybrid fuel cell system has unique features that are most valuable in a distributed power system: the system is modular, easy to scale and to operate. It is quiet, produces very low emissions and requires little maintenance.

The performance of the hybrid fuel cell system has been evaluated by computer simulations and calculations. Optimal integration of the hybrid depends upon balancing fuel usage in the SOFC with waste heat for humidifying fuel cell feed streams. Overall system efficiency, capital, and cost of electricity are similar for the Sequestered and non-Sequestered versions. This is a valuable aspect of future power systems which might need to be retrofitted for sequestration. Specifically, fuel was assumed to cost $3.50 per 1000 cu.ft. and the fuel cells $60/sq.ft. Fuel cells were modeled on the basis of unstaged, co-current flow, for which current density distributions and cell voltages were computed using published resistivity and related data on the cell components. The SOFC was internally recuperated (indirect internal reforming and heat exchange) and the calculation was based on computed rates for the underlying heat transfer and reaction kinetics mechanics. The PEFC was externally humidified. On the basis of these assumptions, it was found that optimal fuel conversion in the SOFC is between 50 and 60 percent, yielding overall system efficiencies between 65 and 70 percent (ac electric/lower heating value basis. Capital required and the cost of electricity are in the $1000/kW and $0.04/kWh range.

The SOFC in the SOFC-PEFC hybrid has a significantly lower fuel utilization (50 to 60 percent) compared to the 85 percent in the typical SOFC system but this simplifies the manage-ment of the waste heat and the production of Hydrogen.

Table 1 provides a comparison between the invented multi-fuel cell system and a high temperature fuel cell/gas turbine system.

TABLE 1

Efficiency of Hybrid Fuel Cell Systems versus Fuel Cell-Turbine Systems

| Device | Con-version[1] | Power Yield[2] (sofc) | (pefc) | Sys. Yld[2] | Rating[3] | Net Eff. | Capital ($/kw) |
|---|---|---|---|---|---|---|---|
| SOFC/PBFC | 0.60[4] | 0.42 | 0.31 | 0.74 | 1439 | 0.711 | 1127 |
| SOFC/GT | 0.90[5] | 0.57 | | 0.67 | 1301 | 0.643 | 1305 |

[1]Conversion = Fuel Utilization;
[2]Direct Current;
[3]Kilowatts;
[4]Air:Fuel Equivalence Ratio of 1.25
[5]Air:Fuel Equivalence Ratio of 3.5

The air:fuel equivalence ratio is an indicator of power density in as much as higher ratios are indicative of larger air handling equipment for a given level of power production. Compressors, conduits, heat exchangers, and reaction vessels are a significant part of the balance of plant costs. An air:fuel equivalence ratio at or below about 1.5, as opposed to 3 to 4 for conventional fuel cell/gas turbine hybrid systems, is a salient component of this invention.

While the invention has been described with reference to details of the illustrated embodiment, these details are not intended to limit the scope of the invention as defined in the appended claims.

The embodiment of the invention in which an exclusive property or privilege is claimed is defined as follows:

1. A device for converting chemical energy to electricity, the device comprising:

a) a high temperature fuel cell having a means for partially oxidizing fuel can completely reforming fuel where the high temperature fuel cell operates at a temperature between 800° C. and 1000° C.; and b) a low temperature fuel cell juxtaposed to said high temperature fuel cell so as to utilize the reformed fuel from the high temperature fuel cell;

wherein the high temperature fuel cell has anionic conducing electrolytes and the low temperature fuel cell has cationic conducting electrolytes.

2. The device as recited in claim 1 wherein the low temperature fuel cell operates between 80° C. and 90° C.

3. The device as recited in claim 1 wherein the means for partially oxidizing fuel reforms the fuel without completely oxidizing the fuel.

4. The device as recited in claim 3 wherein fuel is a hydrocarbon selected from the group consisting of methane, ethane, propane, butane, components of low sulfur gasoline, components of low sulfur diesel, or combinations thereof.

5. The device as recited in claim 1 wherein both fuel cells are air fired.

6. A method for producing electricity comprising:
   a) directing fuel to a first fuel cell;
   b) completely oxidizing a first portion of the fuel and partially oxidizing a second portion of the fuel;
   c) directing the second fuel portion to a second fuel cell;
   d) allowing the first fuel cell to utilize the first portion of the fuel to produce electricity where the first fuel cell operates at a temperature of between approximately 800° C and 1000° C.; and
   e) allowing the second fuel cell to utilize the second portion of the fuel to produce electricity.

7. The method as recited in claim 6 wherein the second fuel cell operates at a temperature of between approximately 80° C. and 90° C.

8. The method as recited in claim 6 wherein the first fuel cell has a solid oxide electrolyte.

9. The method as recited in claim 6 wherein the first fuel cell has anionic conducting electrolytes and the second fuel cell has cationic conducting electrolytes.

10. The method as recited in claim 6 wherein the fuel is a hydrocarbon selected from the group consisting of methane, ethane, propane, butane, components of low sulfur diesel, components of low sulfur gasoline, and combinations thereof.

11. The method as recited in claim 6 wherein the remaining reformed fuel from partially oxidized fuel is syngas.

12. The method as recited in claim 6 wherein complete fuel utilization is achieved without mixing fuel-derived carbon dioxide with air-derived stack gases.

13. The method as recited in claim 6 wherein both fuel cells are air fired.

14. The method as recited in claim 13 wherein an air:fuel equivalence ratio of less than approximately 1.5 is utilized.

* * * * *